US012598167B2

(12) United States Patent
Ries et al.

(10) Patent No.: US 12,598,167 B2
(45) Date of Patent: Apr. 7, 2026

(54) DYNAMIC ENCRYPTED COMMUNICATIONS SYSTEMS USING ENCRYPTION ALGORITHM HOPPING AND NESTED ENCRYPTION

(71) Applicant: RENent LLC, Livermore, CA (US)

(72) Inventors: Richard G. Ries, Livermore, CA (US); Ellen M. Mason, Livermore, CA (US); Nathanael J. Ries, Livermore, CA (US)

( * ) Notice: Subject to any disclaimer, the term of this patent is extended or adjusted under 35 U.S.C. 154(b) by 227 days.

(21) Appl. No.: 18/400,415

(22) Filed: Dec. 29, 2023

(65) Prior Publication Data

US 2024/0171557 A1 May 23, 2024

Related U.S. Application Data

(63) Continuation-in-part of application No. 17/485,389, filed on Sep. 25, 2021, now Pat. No. 11,876,787.

(51) Int. Cl.
  *H04L 9/40* (2022.01)
  *H04L 9/14* (2006.01)

(52) U.S. Cl.
  CPC ............ *H04L 63/0478* (2013.01); *H04L 9/14* (2013.01)

(58) Field of Classification Search
  CPC . H04L 63/0478; H04L 63/0428; H04L 63/18; H04L 9/14; H04L 9/0852; G06F 21/602; G06F 21/76; H04W 12/03
  USPC .................................................. 713/150, 168
  See application file for complete search history.

(56) References Cited

U.S. PATENT DOCUMENTS

| | | | |
|---|---|---|---|
| 2,292,387 A | 8/1942 | Kiesler et al. | |
| 8,127,130 B2 | 2/2012 | Ellis et al. | |
| 8,886,959 B2 * | 11/2014 | Goto ....................... | G06F 21/72 380/28 |
| 11,054,999 B2 * | 7/2021 | Van Duyne .......... | H04L 9/0891 |
| 11,126,356 B2 | 9/2021 | Van Duyne | |
| 2003/0204738 A1 * | 10/2003 | Morgan .............. | H04L 63/0853 713/194 |
| 2004/0073796 A1 * | 4/2004 | Kang .................... | H04W 12/04 713/171 |
| 2006/0126827 A1 * | 6/2006 | Milleville ............. | H04L 9/3236 380/28 |
| 2007/0255941 A1 * | 11/2007 | Ellis ...................... | H04L 9/0662 713/151 |
| 2012/0216036 A1 * | 8/2012 | Barsoum ............. | H04L 63/0428 713/160 |
| 2013/0024691 A1 | 1/2013 | Chowdhury | |

(Continued)

*Primary Examiner* — Samson B Lemma

(57) ABSTRACT

An exemplary apparatus for providing secure communications includes a processor; memory in electronic communication with the processor; an output in electronic communication with the processor; and instructions stored in memory and executable by the processor to cause the apparatus to store encryption protocols and at least one encryption hopping protocol; perform nested encryption of at least some of the data by selecting a number of layers of encryption to apply to data to be transmitted; selecting at least one encryption hopping protocol; encrypting data associated with one layer of encryption with one of the encryption protocols according to the selected encryption hopping protocol, and repeating the encrypting data instructions for each layer of encryption; and then transmit data from one device to at least one other device utilizing the selected encryption hopping protocol.

19 Claims, 6 Drawing Sheets

(56)       References Cited

U.S. PATENT DOCUMENTS

2013/0064372 A1      3/2013  Delport et al.
2020/0092079 A1      3/2020  Bayley et al.
2020/0092728 A1 *    3/2020  Van Duyne ............. H04L 9/088
2021/0377008 A1 *   12/2021  Chien  ................... H04L 9/3297
2022/0269429 A1 *    8/2022  Van Duyne .......... G06F 3/0623
2023/0251786 A1      8/2023  Van Duyne et al.

* cited by examiner

G4/G5 Cellular Network

Bluetooth Network

Ship to Shore, Plane and Space Station Communications

DYNAMIC ENCRYPTED COMMUNICATIONS SYSTEMS USING ENCRYPTION ALGORITHM HOPPING AND NESTED ENCRYPTION

CROSS-REFERENCE TO RELATED APPLICATIONS

This application is a continuation-in-part of U.S. patent application Ser. No. 17/485,389, filed Sep. 25, 2021, which is incorporated by reference herein in its entirety.

FIELD OF THE INVENTION

This invention relates to encrypted communications, and more particularly to secure communications using multiple hardware and/or software encryption algorithms.

BACKGROUND

There is a broad need for communications security across a wide variety of situations, users and industries. Generally, encryption is used in the transfer of information over the Internet for security and commerce; for example, personal information must be encrypted between a user and the website of that user's bank, to protect the user's money and personal information. As another example, two people separated from one another may wish to communicate personal and private information without fear of outside entities intercepting those communications, such as by using messaging applications on their smartphones. The needs for privacy and security are fundamental human needs, and human rights as well.

In the context of communication, encryption is generally performed by a transmitter, which may be hardware or software. That transmitter encrypts the data to be transmitted, and then transmits that encrypted data to a receiving device. The receiving device then decrypts the encrypted data. The receiver performs that decryption based on the particular encryption protocol used. For example, the encryption protocol may be a private key/public key encryption protocol, and the transmitter may possess the public key and the receiver may possess the private key. Traditional encryption technologies known in the art rely on such keys to encrypt and decrypt transmitted data, and render that unusable without the key(s). The data, however, remains subject to attack.

When any encryption protocol is cracked, a new encryption protocol must be selected or created. For hardware encryption, this usually requires a part replacement, or a redesign of the product. For software encryption, this usually requires a redesign of the software with new encryption/decryption algorithms, including a user and device update. Both of these options are expensive and time-consuming, and leave the user without a way to communicate securely in the meantime. History demonstrates that all single encryption methods will eventually fail, no matter how difficult the encryption is or number of bits/bytes used, whether through the use of more clever solutions, the increase in computing power available for brute force solutions, or the advent of new kinds of computers. The advent of quantum computing potentially threatens current encryption methods that rely on hard mathematical problems to encrypt data. The technical problem at the heart of modern cryptography is thus the susceptibility to attack of encryption protocols used for secure communications—particularly today, when practical quantum computing is on the horizon.

Another way in which communications can be made more secure is spread-spectrum technology. Such technology was pioneered during World War II by actress and inventor Hedy Lamarr (Markey) and her co-inventor George Antheil, for use in securely communicating with a remote-control torpedo. A part of a complete message is transmitted on a first channel, then another part is transmitted on a second channel, and so on. Such spread-spectrum technology is the basis for modern technology such as the BLUETOOTH® wireless protocol (Bluetooth SIG, Kirkland, Washington) and the WI-FI® wireless protocol (Wi-Fi Alliance, Austin, Texas). Because spread-spectrum technology is so well-known, it is not particularly secure today, and is utilized more for efficient use of spectrum than for security.

The use of wireless technologies for communication between humans via machines, or for machine-to-machine communications, creates new classes of problems that need to be solved, particularly for machines intended to last for years or decades. A subset of such problems relate to establishing secure communications between machines in a manner that can be secured over a relatively long operating lifetime of a machine, which may be 10 years or longer. Existing solutions to the problem of establishing secure communications between machines may not be efficient or feasible for such applications, because the machines engaged in communications may be unattended, operating remotely, and/or traveling geographically or globally.

Thus, there exists a need for secure communication that does not rely solely on an encryption technique to provide that security.

SUMMARY OF THE INVENTION

In view of at least one of the aforementioned technical problems, one or more embodiments of the invention utilize various schemes for encryption hopping with different encryption protocols. Such hopping does not in itself prevent encrypted transmissions from being hacked or broken, but does complicate any attacks on those transmissions and render them more cost-prohibitive and time-consuming. As a result, such hacking becomes impractical, and/or the amount of time a product can be on market or be installed without encryption updates can be extended. This method of encryption hopping may be used by computers, networks, network communications, WiFi or any electronic communications between 2 or more devices, in both hardware and software. This includes, but is not limited to, mobile devices from cars to wearable devices, smart watches, cell phones and cell phone applications, space and military applications.

An exemplary apparatus for providing secure communications may include a processor; memory in electronic communication with the processor; an output in electronic communication with the processor; and instructions stored in memory and executable by the processor to cause the apparatus to store encryption protocols and at least one encryption hopping protocol; perform nested encryption of at least some of the data by selecting a number of layers of encryption to apply to data to be transmitted; selecting at least one encryption hopping protocol; encrypting data associated with one layer of encryption with one of the encryption protocols according to the selected encryption hopping protocol, and repeating the encrypting data instructions for each layer of encryption; and then transmit data from one device to at least one other device utilizing the selected at least one encryption hopping protocol.

An exemplary method for secure communication of data between two or more devices may include storing encryption protocols; storing at least one encryption hopping protocol; performing nested encryption of at least some of the data, by selecting a number of layers of encryption to apply to data to be transmitted; selecting at least one encryption hopping protocol; encrypting data associated with one layer of encryption with one of the encryption protocols according to the selected encryption hopping protocol; and repeating the encrypting for each layer of encryption; and then transmitting data from one device to at least one other device utilizing the selected at least one encryption hopping protocol.

An exemplary non-transitory computer-readable medium storing code for performing encryption hopping may include instructions executable by a processor to store encryption protocols; store at least one encryption hopping protocol; receive data to be encrypted; perform nested encryption of at least some of the data, the instructions to perform nested encryption including code that includes instructions executable by a processor to select a number of layers of encryption to apply to data to be transmitted; select at least one encryption hopping protocol; encrypt data associated with one layer of encryption with one of the stored encryption protocols according to the selected encryption hopping protocol; and repeat the encrypt data instructions for each layer of encryption; and then transmit data from one device to at least one other device utilizing the selected at least one encryption hopping protocol.

BRIEF DESCRIPTION OF THE DRAWINGS

The use of the same reference symbols in different figures indicates similar or identical items.

DETAILED DESCRIPTION OF THE INVENTION

Figure 1:
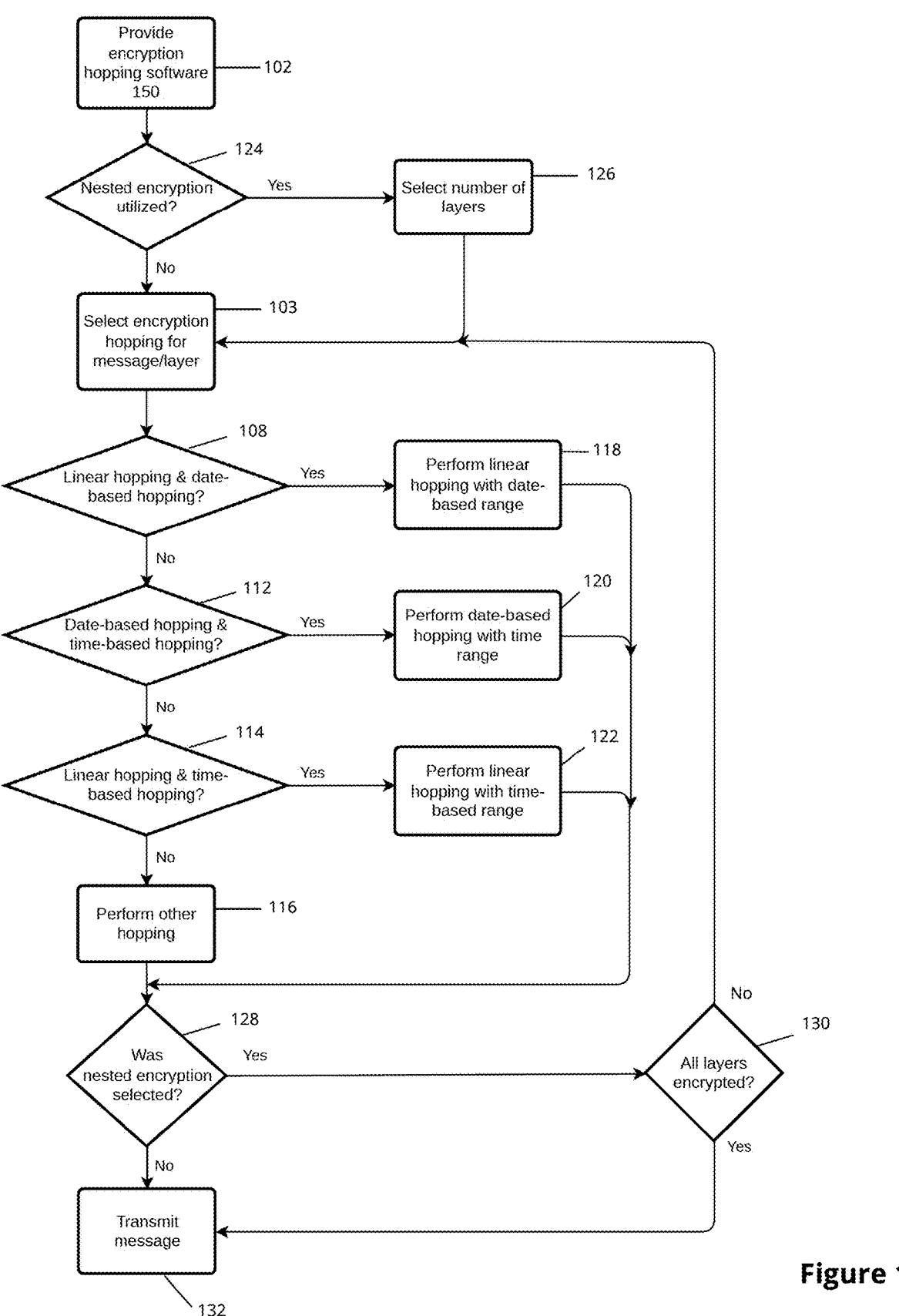
FIG. 1 is an exemplary flowchart describing an encryption hopping process.

Referring to FIG. 1, an exemplary flowchart describing an embodiment of an encryption hopping process 100 is shown. In box 102, encryption hopping software 150 may be provided. Any suitable computer or machine language may be used to implement the process 100 in software, such as but not limited to CAN, SPI, i2c, PHP, Java, C, C++, assembly, Hardware Description Language (HDL) or Verilog (syntactically similar to C language). As used in this document, the term "encryption hopping" is defined to mean changing the encryption protocol used in secure communication between two or more devices based on one or more criteria known to the devices. An "encryption hopping protocol" is an instruction set that controls the changing of the encryption protocols used in secure communication between two or more devices.

The encryption hopping software 150 may include at least two different encryption protocols. Alternately, the encryption hopping software 150 has access to at least two different encryption protocols stored in the device 210 or outside the device 210. In this document, a particular encryption protocol is referred to as Case X, where X is an integer greater than zero. For example, the transmitter 200 may store three different encryption protocols as Case 0, Case 1, and Case 2.

Cryptographic systems can be divided into two categories. Symmetric cryptography (such as the Advanced Encryption Standard or AES) is often used for message encryption. Asymmetric cryptography (such as RSA) is the basis for public key cryptography, and relies on difficult mathematical problems (factoring prime numbers is most common). Asymmetric cryptography is widely used for signatures and key exchanges to secure communications and networks such as email exchanges, virtual private networks (VPNs), and secure webpage connections. One or more of the encryption protocols included in the encryption hopping software 150 may be asymmetric. Alternately, none of the encryption protocols included in the encryption hopping software 150 are asymmetric.

Examples of symmetric cryptographic protocols include, for example, the Advanced Encryption Standard (AES), the Data Encryption Standard (DES), Triple Data Encryption Standard (3DES), RC4, Blowfish, Twofish, QUAD, and Serpent. Examples of asymmetric cryptographic protocols include Rivest-Shamir-Adleman (RSA), Diffie-Hellman, elliptic-curve cryptography (ECC), ElGamal, and Digital Signature Algorithm (DSA). One or more of the encryption protocols stored included in the encryption hopping software 150 may be symmetric. Alternately, none of the encryption protocols included in the encryption hopping software 150 are symmetric.

The encryption protocols included in the encryption hopping software 150, and used by the encryption hopping software 150 in the course of the process 100, may be any of those set forth above, and/or may be any other suitable encryption protocol.

Figure 2:
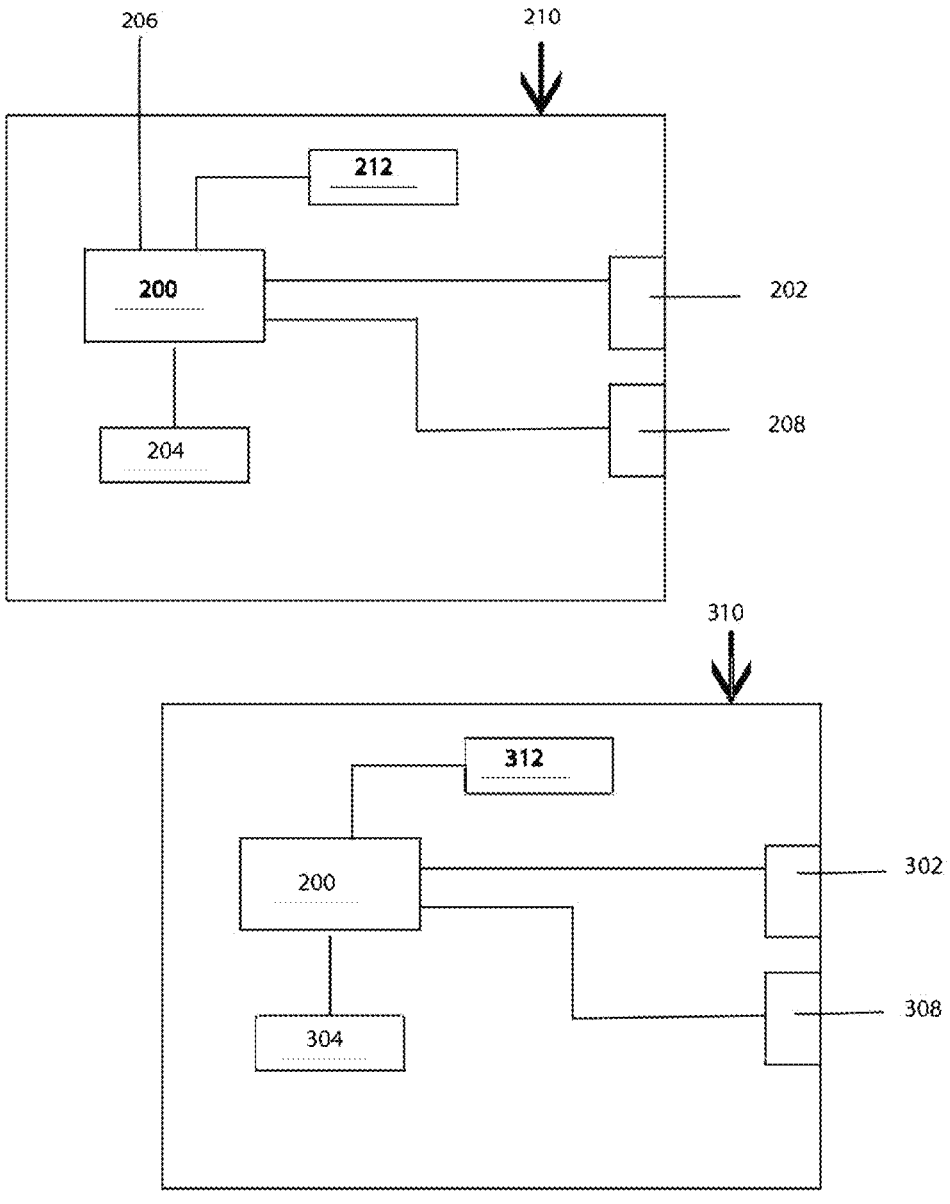
FIG. 2 is a schematic view of a transmitting device and a receiving device.

Referring also to FIG. 2, that encryption hopping software 150 runs on a device 210, which may be a mobile device such as a smartphone, cell phone, smart watch, wearable device, tablet, automobile, other motor vehicle, aircraft or spacecraft. The device 210 also may be a generally-stationary device, such as a desktop computer, or a transceiver fixedly mounted to a telephone pole or other infrastructure. The encryption hopping software 150 may be an app installed on a smartphone, smart watch, tablet or other device. The device 210 may include, or be connected to, a memory 212 that stores the encryption hopping software 150, and a processor unit 206 connected to the memory 212 that executes the instructions contained in the encryption hopping software 150.

According to some embodiments, the device 210 may be a standalone device. In other embodiments, the device 210 may be a component in a larger device, such as a computer peripheral card connected to a network bus. The device 210 may be configured to send encrypted data to an output 202; the processor unit 206 loads the encryption hopping software 150 from the memory 212, executes the instructions contained in the encryption hopping software 150, and outputs encrypted data to the output 202. The output 202 transmits encrypted data to a receiver 300. The output 202 may transmit encrypted data in any suitable manner. As one example, where the output 202 is an antenna, the output 202 may transmit encrypted data via radio waves or another part of the RF spectrum, and/or may transmit encrypted data using the WI-FI® wireless protocol or BLUETOOTH® wireless protocol. As another example, where the output 202 is a physical connector such as an Ethernet port, the output 202 may transmit encrypted data through a wired connection to a wired network. The output 202 may include a photon generator for use in quantum key distribution (QKD). Such a photon generator is configured to generate one or more photons used to communicate a quantum state from the device 210 to the receiver 300. The photon generator may be a laser, laser diode (LD), injection laser diode (ILD), diode laser, light-emitting diode (LED), or any other suitable semiconductor, optoelectronic, or other device capable of generating one or more photons usable to communicate a quantum state. The output 202 may be any hardware that is used to transmit data outward from the device 210 to the receiver 300. The device 210 also may include an input 208 that may receive encrypted data from the receiver 300.

The device 210 may include, or be connected to, a clock 204. The clock 204 provides time data to the device 210. The clock 204 may be a standard real-time clock (RTC) integrated circuit. Alternately, the clock 204 may be any other digital or analog component that provides time data. Where the clock 204 is external to the device 210, that clock 204 may be the National Atomic Clock operated by the National Institute of Standards and Technology, which broadcasts radio signals providing the correct time to users, and which also provides an online web interface via the Internet that provides the correct time to users. The clock 204 need not keep time in standard human notation, and instead may measure time in other ways, such as number of oscillations since power-on.

The encryption hopping software 150 also may run on a receiving device 310, which may be a mobile device such as a smartphone, cell phone, smart watch, wearable device, tablet, automobile, other motor vehicle, aircraft or spacecraft. The device 210 also may be a generally-stationary device, such as a desktop computer, or a transceiver fixedly mounted to a telephone pole or other infrastructure. The encryption hopping software 150 may be an app installed on a smartphone, smart watch, tablet or other device. The receiving device 310 may include, or be connected to, a memory 312 that stores the encryption hopping software 150, and a processor unit 306 connected to the memory 312 that executes the instructions contained in the encryption hopping software 150. The encryption hopping software 150 in the receiving device 310 may be the same software as in the device 210, or may be different software with reduced, expanded, or different functionality. It will be appreciated that in the context of communications, the device 210 and the receiver 300 may be considered to be interchangeable by those skilled in the art, because data is transmitted back and forth between them.

According to some embodiments, the receiving device 310 may be a standalone device. In other embodiments, the receiving device 310 may be a component in a larger device, such as a computer peripheral card connected to a network bus. The receiving device 310 may include an input 308 that may receive encrypted data from the transmitting device 210. The input 308 directs such encrypted data to the processor unit 306, which executes the instructions contained in the encryption hopping software 150, and decrypts the encrypted data received from the input 308. The receiving device 310 may be configured to send encrypted data to an output 302; the processor unit 306 loads the encryption hopping software 150 from the memory 312, executes the instructions contained in the encryption hopping software 150, and outputs encrypted data to the output 302. The output 302 transmits encrypted data to the transmitting device 210. The output 302 may transmit encrypted data in any suitable manner. As one example, where the output 302 is an antenna, the output 302 may transmit encrypted data via radio waves or another part of the RF spectrum, and/or may transmit encrypted data using the WI-FI® wireless protocol or BLUETOOTH® wireless protocol. As another example, where the output 302 is a physical connector such as an Ethernet port, the output 302 may transmit encrypted data through a wired connection to a wired network. The output 302 may be any hardware that is used to transmit data outward from the receiving device 310 to the transmitting device 210.

The receiving device 310 may include, or be connected to, a clock 304. The clock 304 provides time data to the receiving device 310. The clock 304 may be a standard real-time clock (RTC) integrated circuit. Alternately, the clock 304 may be any other digital or analog component that provides time data. Where the clock 304 is external to the receiving device 310, that clock 304 may be the National Atomic Clock operated by the National Institute of Standards and Technology, which broadcasts radio signals providing the correct time to users, and which also provides an online web interface via the Internet that provides the correct time to users. The clock 304 need not keep time in standard human notation, and instead may measure time in other ways, such as number of oscillations since power-on.

Referring also to FIG. 1, the process moves from box 102 to diamond 124. In diamond 124, if nested encryption is utilized, the process moves to box 126, which is described below. If nested encryption is not utilized, the process moves from diamond 124 to box 103. In box 103, the encryption hopping software 150 chooses the type of encryption hopping to use for transmission and reception of encrypted data. According to other embodiments, a user may choose the type of encryption hopping himself or herself. The process 100 moves from box 103 to diamond 108. If the encryption hopping software 150 chooses a combination of linear hopping and date-based hopping, the process moves to box 118. If not, the process 100 moves to diamond 112.

In box 118, the encryption hopping software 150 performs linear hopping in combination with date-based hopping. As used in this document, the term "linear hopping" is defined to mean encryption hopping by using a different encryption protocol for each message than in a previous message. The term "message" may refer to any communication, whether a single bit of data, a packet of data, a text message, an email, or any size of data transmitted and/or received. The previous message may be the previous message sent from the encryption hopping software 150 (referred to as "transmission-based linear hopping"), or the previous message received by the encryption hopping software 150 (referred to as "reception-based linear hopping"). The previous message need not be the immediately previous message. As one example, where transmission-based linear hopping is used, the encryption hopping software 150 transmits a first message utilizing a Case 0 encryption protocol. At a later time, whether or not the encryption hopping software 150 has received a message back in response to the first message, the encryption hopping software 150 transmits a second message, and that second message is encoded utilizing a Case 1 encryption protocol. The "later time" may be almost instantly, as in microseconds later or less, or may be spaced apart further in time, such as by seconds, minutes, hours, days, weeks, months or years. At a still later time, whether or not the encryption hopping software 150 has received a message back in response to the first message, the encryption hopping software 150 transmits a third message, and that third message is encoded utilizing a Case 2 encryption protocol. Each successive message transmitted by the encryption hopping software 150 is encrypted with a different encryption protocol, until the number of messages sent by the encryption hopping software 150 equals the number of encryption protocols included in or accessible by the encryption hopping software 150. After that, the encryption hopping software 150 begins again by encrypting the next message with Case 0. As an example, where the encryption hopping software 150 stores three different encryption protocols Case 0, Case 1 and Case 2, the first message is encrypted utilizing Case 0, the second message is encrypted utilizing Case 1, the third message is encrypted utilizing Case 2, and the fourth message returns to Case 0 and is encrypted utilizing Case 0.

As another example, where reception-based linear hopping is used, the encryption hopping software 150 transmits a first message utilizing a Case 0 encryption protocol. At a later time, the encryption hopping software 150 receives a message utilizing the next encryption protocol, the Case 1 encryption protocol. The "later time" may be almost instantly, as in microseconds later or less, or may be spaced apart further in time, such as by seconds, minutes, hours, days, weeks, months or years. At a later time, based on receipt of that message utilizing the Case 1 encryption protocol, the encryption hopping software 150 transmits another message, and that message is encoded utilizing a Case 2 encryption protocol. Each successive message transmitted by the encryption hopping software 150 is encrypted with a different encryption protocol than the message it previously received, until the number of messages sent and received by the encryption hopping software 150 equals the number of encryption protocols included in or accessible by the encryption hopping software 150. As an example, where the encryption hopping software 150 includes three different encryption protocols Case 0, Case 1 and Case 2, the first message sent by the encryption hopping software 150 is encrypted utilizing Case 0, the next message received by the encryption hopping software 150 is encrypted utilizing Case 1, the next message sent by the encryption hopping software 150 is encrypted utilizing Case 2, and the next message received by the encryption hopping software 150 returns to Case 0 and is encrypted utilizing Case 0.

As used in this document, the term "date-based hopping" is defined to mean encryption hopping on a schedule that utilizes the date on which the message is sent. The schedule may be calendar-based, where the encryption protocol used by the encryption hopping software 150 and receiver 300 on a particular date is based on the calendar date of message transmission and reception. As one example, where the encryption hopping software 150 includes or stores three different encryption protocols Case 0, Case 1 and Case 2, the encryption hopping software 150 may utilize encryption protocol Case 0 for a particular set of dates one or more times in a calendar year, such as from January 1 to January 24, March 1 to May 1, and November 11 to December 5, all in calendar year 2021; the other encryption protocols Case 1 and Case 2 are utilized during other calendar ranges in 2021. Those date ranges may be referred to as "encryption periods." The encryption hopping software 150 may determine the date by communicating with the clock 204. In this example, the date is Jan. 5, 2021, and the clock 204 communicates that date to the encryption hopping software 150. Because the date of Jan. 5, 2021 falls within the range of Jan. 1 to Jan. 24, 2021, the encryption hopping software 150 encrypts the outgoing message utilizing Case 0. Similarly, upon receipt of the message, the receiver 300 determines the date by communicating with its clock 304, and the result of that determination is Jan. 5, 2021, such that the receiver 300 decrypts the incoming message utilizing Case 0. According to some embodiments, the encryption periods may remain the same for all calendar years. According to other embodiments, the encryption periods may change each calendar year. According to other embodiments, the encryption periods may change more frequently, or less frequently, than each calendar year.

Both the encryption hopping software 150 and receiver 300 may be set to the same time zone, to avoid confusion as to the date that should be used for selecting the decryption protocol. Alternately, one of the encryption hopping software 150 and receiver 300 may store the difference in time zone, and use that difference to adjust the date communicated from the clock 204 such that the encryption hopping software 150 and receiver 300 can communicate properly.

In situations where the date is close to changing to the successive date, such as a few seconds prior to midnight, the receiver 300 may receive the message on the following date, and that following date may fall within the next successive encryption period, whether in actuality or due to clock drift and/or a slight lack of time synchronization between the clock 204 used by the encryption hopping software 150 and the clock 304 used by the receiver 300. Consequently, decryption of the message may fail, because the receiver 300 attempts to decrypt the message with an encryption protocol that is different from the one used to encrypt the message. Thus, in box 110, if decryption fails within a short period of time after midnight, the receiver 300 may attempt to decrypt the message again using the immediately previous encryption protocol. That short period of time after midnight may be referred to as the "margin of error time period." Referring back the example above, the encryption hopping software 150 may transmit the message on Jan. 24, 2021, within several microseconds of midnight; it encrypts the message utilizing Case 0. In this example, the receiver 300 receives the message on Jan. 25, 2021, a few seconds after midnight. As a result, the receiver 300 attempts to decrypt the message using Case 1, and consequently decryption of the message that was encrypted using Case 0 fails. The receiver 300 then attempts to decrypt the message using Case 0, which was the encryption protocol that was used immediately previously. That decryption with Case 0 succeeds. Optionally, the receiver 300 communicates to the encryption hopping software 150 that an adjustment in decryption protocol within the margin-of-error time period was performed. This transmission may be the local time and date at the receiver 300 itself. Such communication may be used to trigger synchronization between the encryption hopping software 150 and receiver 300.

Whether triggered by such communication, performed on a regular schedule, or otherwise commanded to do so, the encryption hopping software 150 and receiver 300 may synchronize to ensure accurate communication when date-based hopping is performed. One or more standard methods of clock synchronization may be utilized, such as but not limited to the Network Time Protocol (NTP).

Date-based hopping may use a schedule that is successive-range-based, where the encryption protocol used by the encryption hopping software 150 and receiver 300 on a particular date is based on stored periods of time, not on a calendar date of message transmission and reception. As one example, where the encryption hopping software 150 includes or stores three different encryption protocols Case 0, Case 1 and Case 2, the encryption hopping software 150 may utilize encryption protocol Case 0 for a period of seven days from transmission of its first message, Case 1 for a period of seven days after that, and Case 2 for a period of three days after that. When the time period utilizing the last encryption protocol stored by the transmitter 200 expires, the encryption hopping software 150 returns to Case 0 for the encryption protocol for the next time period.

When date-based hopping is performed using a successive-range-based schedule, time periods used in the schedule may vary over time, from a period of one day to a period that may extend across weeks, months or longer. Further, when date-based hopping is performed using a successive-range-based schedule, the change from one time period to the next need not occur at midnight. Rather, that change may be at a fixed time other than midnight, or may be based on an external event such as the time the first message was transmitted. Additionally, according to other embodiments, the time at which the change from one time period to the next may be altered over time, such as by the receipt of an external command, or by a stored instruction to alter the time of change to the next time period.

The schedule for date-based hopping may be preset, and included or stored in both the encryption hopping software 150, in the device 210 and receiver 300. According to other embodiments, the schedule may be changed one or more times based on instructions transmitted to both the encryption hopping software 150 and receiver 300. According to other embodiments, at least part of the schedule is not stored and the encryption hopping software 150 and/or receiver 300, and the schedule instead may be transmitted to the encryption hopping software 150 and/or receiver 300 from an external source.

The combination of linear hopping and date-based hopping provides additional security. Linear hopping is performed in box 118, through a range of dates on a schedule, as described above. As one example, at the beginning of a date range in which encryption protocol Case 2 is to be used, a flag is set that is associated with Case 2, and messages transmitted and received while that flag is set are encrypted and decrypted utilizing Case 2. As another example, before encrypting or decrypting a packet, message or other quantity of data, the date is checked, and the encryption protocol to be used in that date range is utilized. The process 100 then moves to box 103. If the combination of linear hopping and date-based hopping was not chosen by the encryption hopping software 150, the process 100 moves to diamond 112 as described above.

In diamond 112, if the encryption hopping software 150 chooses a combination of date-based hopping and time-based hopping, the process moves to box 120. If not, the process moves to diamond 114.

Turning to box 120, as used in this document, the term "time-based hopping" is defined to mean encryption hopping on a schedule that utilizes the time on which the message is sent. According to some embodiments, the schedule may be successive-range-based, where the encryption protocol used by the encryption hopping software 150 and receiver 300 is based on stored periods of time, not on a particular time stored by the clock. The stored periods of time may be any measurable periods of time, such as ranges measured in picoseconds or nanoseconds to ranges measured in hours, days, weeks, months or years. As one example, where the encryption hopping software 150 includes or stores three different encryption protocols Case 0, Case 1 and Case 2, the encryption hopping software 150 may utilize encryption protocol Case 0 for a period of ten microseconds from transmission of its first message, Case 1 for a period of 17 seconds after that, and Case 2 for a period of 2 seconds after that. When the period utilizing the last encryption protocol stored by the transmitter 200 expires, the encryption hopping software 150 returns to Case 0 for the encryption protocol for the next time period. In each successive time period, an encryption protocol is utilized that is different from the one utilized in the previous time period.

According to some embodiments, the encryption hopping software 150 may be included within the first device 210, and the receiver 300 may be included within a second device. Those two devices may be capable of being paired, such as through BLUETOOTH® technology. If so, the starting time from which the stored periods of time are measured may be the time when those two device are paired.

According to other embodiments, the schedule may be clock-based, where the encryption protocol used by the encryption hopping software 150 and receiver 300 at a particular time is based on the clock time message transmission and reception. As one example, where the encryption hopping software 150 includes or stores three different encryption protocols Case 0, Case 1 and Case 2, the encryption hopping software 150 may utilize encryption protocol Case 0 for a particular set of times, such as from 12:01:00-12:00:02 am, from 1:01:30-2:30:35 am, and from 11:05:05 am-3:45:02 pm; the other encryption protocols Case 1 and Case 2 may be utilized during other times of the day. Those time ranges may be referred to as "encryption periods." Optionally, those time ranges may vary based on the date or on the specific day of the week. In box 114, the encryption hopping software 150 determines the time by communicating with the clock 204. In this example, the time is 1:35:42 am, and the clock 204 communicates that date to the transmitter 200. Because the time of 1:35:42 am falls within the range of 1:01:30-2:30:35 am, the encryption hopping software 150 encrypts the outgoing message utilizing Case 0. Similarly, upon receipt of the message, the receiver 300 determines the date by electronically communicating with the clock 304, and the result of that determination is Jan. 5, 2021, such that the receiver 300 decrypts the incoming message utilizing Case 0.

As described above with regard to box 118, a margin of error time period may need to be considered for time-based hoping when the encryption periods are short, and/or when a time for switching between encryption protocols is approaching. As set forth above, in order to compensate, the receiver 300 may fall back to the immediately-previous encryption protocol if the encryption protocol it is attempting to use fails, and/or the receiver 300 may send the transmitter a request for synchronization.

Whether triggered by such communication, performed on a regular schedule, or otherwise commanded to do so, the encryption hopping software 150 in the device 210 and the receiver 300 may synchronize to ensure accurate communication when time-based hopping is performed. One or more standard methods of clock synchronization may be utilized, such as but not limited to the Network Time Protocol (NTP).

The combination of date-based hopping and time-based hopping provides additional security. In box 120, the date and time are determined, and an encryption protocol is chosen based on the time of encryption or decryption of data on a particular date. A lookup table or other database may be used to store the encryption protocols used during particular time ranges on each date, and a specific encryption protocol is selected for encrypting and decrypting data received during that time range.

As another example, the time-based hopping interacts with the particular date to determine the encryption protocol to be used. For example, during a particular time range, the schedule for time-based hopping may utilize encryption protocol Case 1; if that time range occurs on a Monday, or an odd-numbered date, or a date having some other property, the encryption protocol utilized may shift upward or downward one number or by more than one number, such as to Case 2. As another example, on a particular date, the schedule for date-based hopping may utilize encryption protocol Case 2; if the time a message is sent or received falls within a particular range, the encryption protocol utilized may shift upward or downward one number or by more than one number, such as to Case 4. The process 100 then moves to box 103. If the combination of date-based hopping and time-based hopping was not chosen by the encryption hopping software 150, the process 100 moves to diamond 114 as described above.

In diamond 114, if the encryption hopping software 150 chooses a combination of linear hopping and time-based hopping, the process moves to box 122. If not, the process moves to box 116.

The combination of linear hopping and time-based hopping provides additional security. Linear hopping is performed in box 122, through a range of times on a schedule, as described above. As one example, at the beginning of a time range in which encryption protocol Case 0 is to be used, a flag is set that is associated with Case 0, and messages transmitted and received while that flag is set are encrypted and decrypted utilizing Case 0. As another example, before encrypting or decrypting a packet, message or other quantity of data, the time is checked, and the encryption protocol to be used in that time range is utilized. The process 100 then moves to box 103. If the combination of linear hopping and time-based hopping was not chosen by the encryption hopping software 150, the process 100 moves to box 116 as described above.

In box 116, if none of the previous types or combinations of encryption hopping have been chosen by the encryption hopping software 150, the encryption hopping software 150 chooses another type of encryption hopping, any combination of different types of encryption hopping, or no encryption hopping at all. As one example, the encryption hopping software 150 may choose linear hopping on its own. As another example, the encryption hopping software 150 may choose date-based hopping by itself. As another example, the encryption hopping software 150 may choose time-based hopping by itself. As another example, the encryption hopping software 150 may choose any combination of hopping described above. As another example, the encryption hopping software 150 may choose spread-spectrum transmission of encrypted data without hopping. The examples of encryption hopping described above are exemplary and not exhaustive. In a broad sense, encryption hopping as described in this document utilizes publicly-accessible information to select private information utilized for encryption, specifically, the type of encryption or decryption to be utilized for a particular message. Thus, hopping may be based on sidereal time, celestial coordinates, GPS coordinates, coordinates based on other terrestrial or satellite navigation systems, signals received from cellular telephone/data towers or satellites, weather characteristics measured or reported at a particular location (e.g., temperature, humidity, windspeed, precipitation and/or barometric pressure), lunar phase, tide levels and/or times (e.g., high tide and/or low tide) at a particular location, time and/or intensity of earthquakes as measured by the US Geological Survey, or any other publicly-accessible data.

Next, the process 100 moves to diamond 128. Nested encryption was not selected at diamond 124, and consequently the process moves to box 132, where the message is transmitted by the transmitter 200. For decryption of the next message to be received, or encryption of the next message to be transmitted, the process 100 begins again at diamond 124.

Once an encryption hopping protocol has been selected, the encryption hopping software 150 may continue to utilize it. Optionally, the encryption hopping protocol itself may change from time to time to provide additional security. One way in which the use of encryption hopping can defeat attacks, even by a quantum computer, is that all packets transmitted from a transmitter 200 to a receiver 300 look the same to an attacker, even after a change in encryption caused by encryption hopping. That is, all packets are the same length, and all packets are a combination of binary ones and zeros, such that it is impossible for an attacker to determine immediately that the encryption protocol used to encrypt those packets has changed. The changes in encryption are perceived as erratic and irregular to an attacker, but to the users, the changes are expected and known. In this way, even a quantum computer cannot intercept and decode all messages exchanged between a transmitter 200 and receiver 300 utilizing the encryption method 100.

Returning to diamond 124, if nested encryption is utilized, the process 100 moves to box 126. To provide an additional layer of security, nested encryption may be performed utilizing encryption hopping. As used in this document, the term "nested encryption" refers to re-encrypting already-encrypted information. Nested encryption may be performed using one or more layers, where each layer is another encryption. For example, nested encryption with one layer utilizes one additional encryption of initially-encrypted data; nested encryption with two layers utilizes two additional encryptions of initially-encrypted data, and so on. The use of nested encryption provides additional security, such as when the transmitting unit is intended to remain in one location clandestinely for a long period of time. During that period of time, an encryption algorithm used as one of the layers of nested encryption may be broken. If that happens, the additional layer or layers of encryption provided by nested encryption prevent an attacker from decoding the data encrypted by that additional layer or layers.

According to some embodiments, each layer of encryption may be more secure than the previous layer. For example, raw data may be encrypted using an AES 128 algorithm, and then re-encrypted using a stronger AES 192 algorithm. According to other embodiments, the strength of each layer of encryption is unrelated to the strength of any previous layer of encryption. For example, raw data may be encrypted using an AES 192 algorithm, and then re-encrypted using a weaker AES 128 algorithm.

At box 126, the number of layers of nested encryption is determined. According to some embodiments, the number of layers of nested encryption is fixed, and is preset by the encryption hopping software 150. That is, at box 126, determining a number of layers is performed by selecting a single fixed number. According to other embodiments, the encryption hopping software 150 may be configured to utilize one, two, three, or more layers of nested encryption for each communication. Utilization of three layers of nested encryption has been found to provide additional security without excessive computational demand or power utilization.

According to other embodiments, the number of layers of nested encryption is itself set by layer hopping. Similar to the definition of encryption hopping, "layer hopping" is defined to mean determining the number of layers of nested encryption used in secure communication between two or more devices based on one or more criteria known to the devices. As one example, linear hopping as described above, whether transmission-based or reception-based, is used to determine the number of layers of nested encryption in a message to be sent. For example, the encryption hopping software 150 may be configured to provide one, two or three layers of nested encryption. The encryption hopping software 150 may transmit a first message using one layer of nested encryption. At a later time, the encryption hopping software 150 receives a message using two layers of nested encryption. The "later time" may be almost instantly, as in microseconds later or less, or may be spaced apart further in time, such as by seconds, minutes, hours, days, weeks, months or years. Note that the number of layers of encryption was increased by one. The next message transmitted by the encryption hopping software 150 then transmits a message using three layers of encryption. Each message sent by the encryption hopping software 150 is encrypted with an additional layer of encryption than the message most recently received. The encryption hopping software 150 continues to add layers after each received message until the maximum number of layers is reached, at which point the encryption hopping software 150 returns to the lowest number of layers. In another embodiment, only the number of transmissions from the transmitter 200 controls the number of layers utilized. For example, the encryption hopping software 150 may be configured to provide one, two or three layers of nested encryption. The encryption hopping software 150 may transmit a first message using one layer of nested encryption. At a later time, the encryption hopping software 150 receives a message using one layer of nested encryption, acknowledging the one layer of nested encryption used in the previous message. The next message transmitted by the encryption hopping software 150 then transmits a message using two layers of encryption, one more than the previous transmission. Each successive message transmitted by the encryption hopping software 150 is encrypted with a different encryption protocol than the message it previously transmitted, until the number of messages sent and received by the encryption hopping software 150 equals the number of encryption protocols included in or accessible by the encryption hopping software 150. Referring to the previous example, after the encryption hopping software 150 has transmitted a message with three layers of nested encryption and received back a message using three layers of nested encryption, the next message sent by the encryption hopping software 150 utilizes one layer of nested encryption.

As another example, date-based hopping as described above is used to determine the number of layers of nested encryption in a message to be sent. That date-based hopping may be calendar-based, as described above, where the number of layers utilized for nested encryption depends on the date of message transmission. For example, the encryption hopping software 150 may be configured to provide one, two or three layers of nested encryption. The encryption hopping software 150 may utilize one layer of nested encryption in January, April and September; two layers in February, October and December; and three layers during the remaining months. Those date ranges may be referred to as "layer periods." As described above, the encryption hopping software 150 may determine the date by communicating with the clock 204. The encryption hopping software 150 may handle time zones and transmissions near the beginning or end of a particular date as described above with regard to date-based encryption hopping. Also as described above, date-based hopping for determination of the number of layers of nested encryption to be used for transmission and/or reception may use a schedule that is successive-range-based rather than date-based.

As another example, time-based hopping as described above is used to determine the number of layers of nested encryption in a message to be sent. Time-based hopping is based on a schedule that utilizes the time on which the message is sent. That schedule may be clock-based, where the number of layers of nested encryption provided by the encryption hopping software 150 and receiver 300 at a particular time is based on the clock time of message transmission and reception. For example, the encryption hopping software 150 may be configured to provide one, two or three layers of nested encryption. The encryption hopping software 150 may utilize one layer of nested encryption between 12:00:00-3:45:00 am, 9:12:00 am-3:03:00 pm, and 5:45:42-7:02:12 pm; two layers of nested encryption between 3:45:01-6:19:12 am and 7:02:13-10:55:04 pm; and three layers of nested encryption at all other times. Those time ranges may be referred to as "layer periods." Optionally, those time ranges may vary based on the date or on the specific day of the week. The encryption hopping software 150 may handle time zones and transmissions near the beginning or end of a particular layer period as described above with regard to time-based encryption hopping. Also as described above, time-based hopping for determination of the number of layers of nested encryption to be used for transmission and/or reception may use a schedule that is successive-range-based rather than clock-based.

After the number of layers of nested encryption have been determined, the process moves from box 126 to box 103, in which the encryption protocol for a layer is selected by the encryption hopping software 150. According to some embodiments, the encryption protocol for each layer is fixed. For example, the first layer may be encrypted with a Case 1 encryption protocol, the second layer may be encrypted with a Case 2 encryption protocol, and so on for as many layers as box 126 determined to utilize. According to other embodiments, the process 100 continues for each layer of nested encryption in the same manner as described above for an individual message. The process moves from box 103 to diamond 108. If the encryption software chooses a combination of linear hopping and date-based hopping, the process 100 moves from diamond 108 to box 118. If not, the process 100 moves from diamond 108 to box 118.

In box 118, the encryption hopping software 150 performs linear hopping in combination with date-based hopping to determine the encryption protocol to be used for a layer of nested encryption. As one example, where transmission-based linear hopping is used, the encryption hopping software 150 transmits a first message utilizing a Case 0 encryption protocol for a particular layer of nested encryption. At a later time, whether or not the encryption hopping software 150 has received a message back in response to the first message, the encryption hopping software 150 transmits a second message, and that second message is encoded utilizing a Case 1 encryption protocol for that particular layer of nested encryption. At a still later time, whether or not the encryption hopping software 150 has received a message back in response to the first message, the encryption hopping software 150 transmits a third message, and that third message is encoded utilizing a Case 2 encryption protocol for that particular layer of nested encryption. Each successive message transmitted by the encryption hopping software 150 is encrypted with a different encryption protocol for that particular layer of nested encryption, until the number of messages sent by the encryption hopping software 150 equals the number of encryption protocols included in or accessible by the encryption hopping software 150. After that, the encryption hopping software 150 begins again by encrypting the next message with Case 0 for that particular layer of nested encryption. As an example, where the encryption hopping software 150 stores three different encryption protocols Case 0, Case 1 and Case 2, the first message is encrypted utilizing Case 0 for that particular layer of nested encryption, the second message is encrypted utilizing Case 1 for that particular layer of nested encryption, the third message is encrypted utilizing Case 2 for that particular layer of nested encryption, and the fourth message returns to Case 0 and is encrypted utilizing Case 0 for that particular layer of nested encryption. In other words, each time a new message is sent, the encryption protocol selected to be associated with at least one layer of nested encryption is changed to a different encryption protocol based on a stored list of available encryption protocols.

As another example, where reception-based linear hopping is used, the encryption hopping software 150 transmits a first message utilizing a Case 0 encryption protocol for a particular layer of nested encryption. At a later time, the encryption hopping software 150 receives a message utilizing the next encryption protocol, the Case 1 encryption protocol, for that particular layer of nested encryption. Based on receipt of that message utilizing the Case 1 encryption protocol, the encryption hopping software 150 transmits another message, and that message is encoded utilizing a Case 2 encryption protocol for that particular layer of nested encryption. Each successive message transmitted by the encryption hopping software 150 is encrypted with a different encryption protocol for that particular layer of nested encryption than the message it previously received, until the number of messages sent and received by the encryption hopping software 150 equals the number of encryption protocols included in or accessible by the encryption hopping software 150. As an example, where the encryption hopping software 150 includes three different encryption protocols Case 0, Case 1 and Case 2, the first message sent by the encryption hopping software 150 is encrypted utilizing Case 0 for a particular layer of nested encryption, the next message received by the encryption hopping software 150 is encrypted utilizing Case 1 for that particular layer of nested encryption, the next message sent by the encryption hopping software 150 is encrypted utilizing Case 2 for that particular layer of nested encryption, and the next message received by the encryption hopping software 150 returns to Case 0 and is encrypted utilizing Case 0 for that particular layer of nested encryption.

In box 118, date-based hopping is used in conjunction with linear hopping to select an encryption protocol for at least one of the layers of nested encryption. In some embodiments, calendar-based hopping may be used. As one example, where the encryption hopping software 150 includes or stores three different encryption protocols Case 0, Case 1 and Case 2, the encryption hopping software 150 may utilize encryption protocol Case 0 for a particular set of dates one or more times in a calendar year, such as from January 1 to January 24, March 1 to May 1, and November 11 to December 5, all in calendar year 2021; the other encryption protocols Case 1 and Case 2 are utilized during other calendar ranges in 2021. In other words, each time a new message is sent or received, the encryption protocol selected to be associated with at least one layer of nested encryption is based on the calendar date of transmission or receipt of that message. The encryption hopping software 150 may determine the date by communicating with the clock 204. In this example, the date is Jan. 5, 2021, and the clock 204 communicates that date to the encryption hopping software 150. Because the date of Jan. 5, 2021 falls within the range of January 1 to Jan. 24, 2021, the encryption hopping software 150 encrypts the outgoing message utilizing Case 0. Similarly, upon receipt of the message, the receiver 300 determines the date by communicating with its clock 304, and the result of that determination is Jan. 5, 2021, such that the receiver 300 decrypts the incoming message utilizing Case 0. According to some embodiments, the encryption periods may remain the same for all calendar years. According to other embodiments, the encryption periods may change each calendar year. According to other embodiments, the encryption periods may change more frequently, or less frequently, than each calendar year. Handling of time zones, and transmissions and receptions near the beginning or end of an encryption period, may be handled as described above. Also as described above, date-based hopping performed in box 118 for a layer of nested encryption may use a schedule that is successive-range-based rather than date-based.

After completion of box 118, the process 100 then moves to diamond 128. If the combination of linear hopping and date-based hopping was not chosen by the encryption hopping software 150, the process 100 moves to diamond 112 as described above. In diamond 112, if the encryption hopping software 150 chooses a combination of date-based hopping and time-based hopping, the process moves to box 120. If not, the process moves to diamond 114.

In box 120, the encryption hopping software 150 performs date-based hopping in combination with time-based hopping for a layer of nested encryption. Date-based hopping may be performed in the manner described above. However, that date-based hopping is used to select an encryption protocol for that layer of nested encryption. For example, date-based hopping may be used to select an encryption protocol from the group Case 0, Case 1, Case 2, and Case 3.

The schedule utilized for time-based hopping may be clock-based, where the encryption protocol used by the encryption hopping software 150 at a particular time is based on the clock time of message transmission and reception. As one example, where the encryption hopping software 150 includes or stores three different encryption protocols Case 0, Case 1 and Case 2, the encryption hopping software 150 may utilize encryption protocol Case 0 for a layer of nested encryption during a first particular set of clock times, such as 12:09 am to 5:15 am and 11:44 am to 4:12 pm; may utilize encryption protocol Case 1 for that layer of nested encryption during a second particular set of clock times, such as from 8:18 am through 9:25 am and from 9:19 pm through 11:33 pm; and may utilize encryption protocol Case 2 for that layer of nested encryption at all other times. In other words, each time a new message is sent or received, the encryption protocol selected to be associated with at least one layer of nested encryption is based on the clock time of transmission or receipt of that message. As another example, the schedule utilized for time-based hopping may be successive-range-based.

Also as described above, time-based hopping for selection of an encryption protocol to be used for at least one of the layers of nested encryption may use a schedule that is successive-range-based rather than date-based. For example, where the encryption hopping software 150 includes or stores three different encryption protocols Case 0, Case 1 and Case 2, for a successive-range-based schedule, the encryption hopping software 150 may utilize encryption protocol Case 0 for a layer of nested encryption for a period of ten microseconds from transmission of its first message, Case 1 for that layer of nested encryption for a period of 17 seconds after that, and Case 2 for that layer of nested encryption for a period of 2 seconds after that. When the period utilizing the last encryption protocol stored by the transmitter 200 expires, the encryption hopping software 150 returns to Case 0 for that layer of nested encryption for the encryption protocol for the next time period. In each successive time period, an encryption protocol is utilized that is different from the one utilized in the previous time period.

The encryption hopping software 150 may handle time zones and transmissions near the beginning or end of a particular time range, as well as margins of error, as described above with regard to time-based encryption hopping.

In diamond 112, if the encryption hopping software 150 chooses a combination of linear hopping and time-based hopping, the process moves to box 122. If not, the process moves to box 116.

The combination of linear hopping and time-based hopping provides additional security. Linear hopping is performed in box 122, through a range of times on a schedule, as described above. As one example, at the beginning of a time range in which encryption protocol Case 0 is to be used, a flag is set that is associated with Case 0 for a layer of nested encryption, and messages transmitted and received for that layer of nested encryption while that flag is set are encrypted and decrypted utilizing Case 0. As another example, before encrypting or decrypting a packet, message or other quantity of data, the time is checked, and the encryption protocol to be used in that time range is utilized for that layer of nested encryption. If the combination of linear hopping and time-based hopping was not chosen by the encryption hopping software 150, the process 100 moves to box 116 as described above.

At box 116, other hopping may be performed for a particular layer of nested encryption, as described above.

After encryption has been performed at one of boxes 118, 120, 122, or 116 for a layer of encryption, the process moves to diamond 128. If nested encryption was selected at diamond 124, the process moves to diamond 130. If all layers are not encrypted, the process 100 moves from diamond 128 back to box 103, where the encryption protocol for another layer is selected as described above. If all layers have been encrypted, the process moves from diamond 128 to box 132, where the message is transmitted by the transmitter 200. For decryption of the next message to be received, or encryption of the next message to be transmitted, the process 100 begins again at diamond 124.

According to some embodiments, the encryption hopping software 150 ensures that an encryption protocol utilized for one layer of nested encryption cannot be duplicated in another layer. In this way, if an encryption protocol is broken or otherwise become insecure or less secure, and that encryption protocol is utilized in a layer of nested encryption, that vulnerability can be exploited against only that one layer of nested encryption. According to other embodiments, the encryption hopping software 150 allows an encryption protocol utilized for one layer of nested encryption to be duplicated in another layer. Still further security may be achieved by switching between using nested encryption and not using nested encryption. That switching, based on hopping, further confuses hostile attempts to decrypt a message because an attacker would be unaware of the timing of that switching, or even the existence of that switching.

In none of the above examples is a key transmitted from the sender to the receiver, nor are keys exchanged between the sender and the receiver, prior to the sender sending an encrypted message to the receiver. Transmission and/or exchange of keys is not required in order to initiate the sending of a message, and key exchange is not required to initiate or perform encryption hopping as claimed in the present application. While key exchange may occur in the current system, such exchange is not required in order initialize a communication session, nor to perform encryption or encryption hopping. Indeed, a strength of the system described in this document is that the sender and receiver can communicate over a long period of time, intermittently, at intervals that cannot be predicted by a potential eavesdropper, without the need to expose and exchange one or more keys. For example, military sonar buoys may remain in place for a long duration, and may communicate only infrequently with an external user. Such buoys are difficult to update, at best, and a requirement to perform key exchange to initiate communication would hamper the ability of such sonar buoys to transmit vital information to an external user or users. As another example, where a device is placed at a clandestine location, each transmission from that device may provide information to an adversary about the existence and location of that device; by eliminating the need for key exchange, the number of transmissions from that device is reduced, making the device more resistant to an adversary. The use of nested encryption without key exchange thus solves at least one technical problem relating to encryption of messages to and from devices placed in remote locations that may or may not be clandestinely positioned.

The message transmitted with any of the hopping and/or spread-spectrum approaches described above may be, or may include, a quantum key for use in quantum cryptography. Due to the nature of quantum systems, it is impossible to copy data encoded in a quantum state. If the data encoded in a quantum state is tampered with in any way, the quantum state will change due to a wave-function collapse as a result of the no-cloning principle (the principle that it is impossible to create an independent and identical copy of an arbitrary unknown quantum state). The most prevalent example of quantum cryptography is quantum key distribution (QKD), which involves the previously mentioned quantum mechanical phenomena to create a secure communication method. QKD superposes or entangles a quantum state that is then shared between the two parties attempting secure communication. The primary useful property of QKD is it enables two communicating parties to detect the intrusion of a third party attempting to access the key. Utilizing quantum superposition or entanglement and the transmission of quantum information, one can establish a secure line such that any third party trying to steal the key would have to measure the encoded quantum state of the key, thereby introducing detectable anomalies into the now collapsed quantum system. No vital information is shared between the two users until the key (i.e., the quantum state) is received by both parties without evidence of tampering. QKD typically doesn't encrypt the actual data, but rather allows users to securely distribute classical keys which can then be used for encrypted communication.

The main drawback to QKD is that, similar to conventional public key distributions, it usually relies on the use of authenticated classical communication channels. In the context of modern cryptography, having an authenticated classical channel means that one has either already exchanged a symmetric key of sufficient length or public keys of sufficient security level. Applying encryption hopping to the classical communication method inherent in QKD, in combination with the additional security ingrained in the shared quantum state, would give rise to an even more secure communication channel than either used individually. For example, after QKD has been utilized to securely distribute classical keys used for encrypted communications, the encryption hopping process 100 may be utilized in the transmission of data. Encryption hopping in any of the forms described above with regard to the encryption hopping process 100 may be performed after the initial exchange of keys via QKD. As another example, any of the forms of encryption hopping as described in the context of the encryption hopping process 100 may be used to trigger the distribution of new keys via QKD. For example, in box 118, the encryption hopping software 150 may perform linear hopping in combination with date-based hopping time-based hopping to trigger the distribution of new keys via QKD. As another example, in box 120, the encryption hopping software 150 may perform date-based hopping and time-based hopping to trigger the distribution of new keys via QKD. As another example, in box 122, the encryption hopping software 150 may perform linear hopping and time-based hopping to trigger the distribution of new keys via QKD. As another example, in box 116, the encryption hopping software 150 may perform any type of encryption hopping or any combination of different types of encryption hopping to trigger the distribution of new keys via QKD.

Hardware

Figure 3:
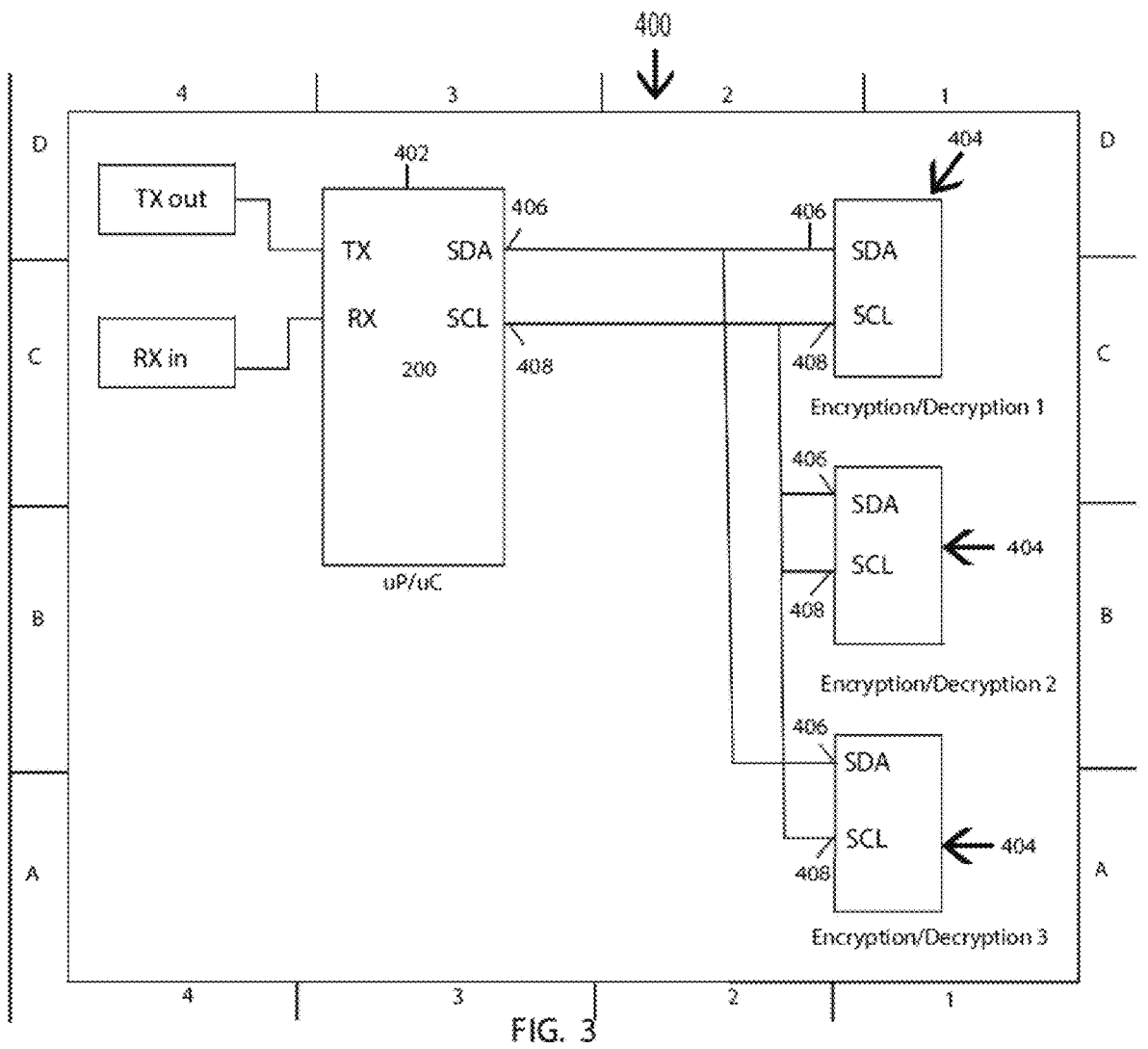
FIG. 3 is a schematic view of a controller and a plurality of encryption processors.

Referring also to FIG. 3, at least part of the process 100 above may be implemented in hardware. Unless otherwise indicated below, the steps of the process 100 above and the actions of the encryption hopping software 150 operate similarly to the manner in which they are described above. The encryption hopping software 150 runs on a controller 402, which may be located within a larger hardware component 400. Two or more encryption microprocessors 404 may be included within the component 400. Each encryption microprocessor 404 includes at least one encryption protocol stored within. Multiple encryption protocols may be implemented in Verilog or HDL languages, and stored in a single encryption microprocessor 404. According to other embodiments, a single encryption protocol is stored in each encryption microprocessor 404. The encryption microprocessors 404 may be integrated circuits, field-programmable gate arrays (FPGAs), microcontrollers, or any other suitable hardware. The encryption microprocessors 404 are configured to store one or more encryption protocols, and also to perform encryption and/or decryption of data transmitted to those encryption microprocessors 404.

The encryption microprocessors 404 are connected to the controller 402 via physical connections such as wires or fiber optic cables, and via data protocols such as the I2C protocol, although other data protocols and interfaces may be utilized if desired. The I2C bus carries two signals: the data (SDA) and clock (SCL) lines. The controller 402, and the encryption microprocessors 404, each may include a first physical pin 406 to connect to the SDA line and a second physical pin 408 to connect to the SCL line. According to other embodiments, a different physical connection and/or data protocol may be used to connect the controller 402 to the one or more encryption microprocessors 404. For example, the data protocol utilized may be Transmission Control Protocol (TCP), User Datagram Protocol (UDP), Internet Control Message Protocol (ICMP), non-return-to-zero (NRZ), Controller Area Network (CAN) bus, or any other data protocol that allows those components to communicate.

The encryption process 100 described above may be performed with the hardware component 400. The encryption hopping software 150 may run on the controller 402, and selects the type of encryption hopping performed in the encryption process 100. Because the encryption microprocessors 404 are configured to store one or more encryption protocols, and also to perform encryption and/or decryption of data transmitted to those encryption microprocessors 404, the encryption and decryption of the encryption process 100 is performed by the encryption microprocessors 404.

The hardware component 400 may be configured to transmit data across multiple channels. For example, the BLUETOOTH® Low Energy protocol uses frequency hopping within the frequency domain 2.402-2.480 GHz, which is divided into 40 channels, each with a bandwidth of 2 MHz for Channels 0-39. The BLUETOOTH® protocol uses frequency-hopping spread spectrum technology; it divides transmitted data into packets, and transmits each packet on a designated channel. Each channel may be associated with a specific encryption protocol. For example, data transmitted by the hardware component 400 on Channel 0 may use encryption protocol Case 0, data transmitted on Channel 1 may use encryption protocol Case 1, and so on. The number of encryption protocols may be less than the number of channels, in which case groups of two or more channels may use one encryption protocol. The receiver 300 then decrypts the communication in the same manner, using encryption protocol Case 0 to decrypt packets on Channel 0, encryption protocol Case 1 to decrypt packets on Channel 1, and so on. Encryption hopping as described above may be performed on all of the channels collectively. For still further security, a different form of encryption hopping may be performed on each channel or on a subset of channels.

According to some embodiments, null data may be transmitted over one or more channels, and actual data to be decrypted is transmitted over one or more other channels. The channel number or numbers containing actual data may be transmitted from the hardware component 400 to the receiver 300 as part of the data that is encrypted. The receiver 300 may then decrypt only the channel or channels carrying actual data to be communicated.

Use Cases

Figure 4:
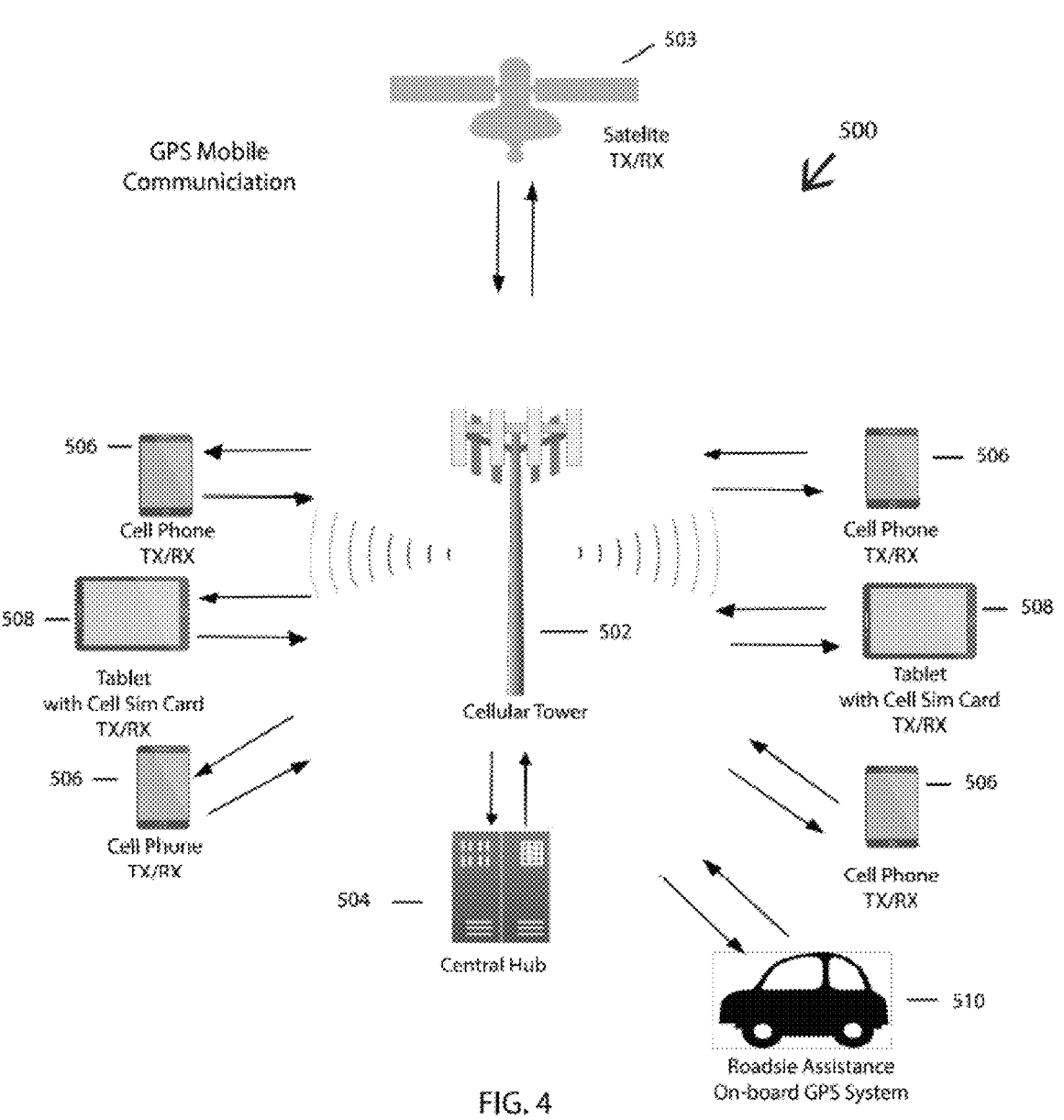
FIG. 4 is a schematic view of a cellular network in which the process of FIG. 1 and/or the devices of FIG. 2 may be utilized.

Referring also to FIG. 4, use cases for the process 100, device 210 and receiver 300 are shown in the context of a cellular network 500, such as a 4G, 5G, or other network used for the transmission of data. The cellular network 500 includes cellular towers 502 and one or more central hubs 504. Optionally, the cellular network 500 may include one or more satellites 503 in Earth orbit used to transmit data. Thus, each device described in the context of the cellular network 500 of FIG. 4, utilizing the services of the cellular towers 502 and central hub(s) 504 may be considered to be either a transmitting device 210 or a receiver 300, and any of those devices may utilize the process 100 for transmitting encrypted data as either a transmitting device 210 or a receiver 300. The cellular network 500 may be utilized by a cell phone 506, a tablet 508 with a cellular sim card, an automobile 510 or other vehicle, and/or a roadside onboard assistance system in that automobile 510 or other vehicle. Communications between any of the devices that utilize the cellular network 500 may be encrypted using the process 100, implemented on the devices themselves, without the need for the cellular network 500 to perform any tasks related to encryption; the cellular network 500 simply transmits encrypted data between devices.

Figure 5:
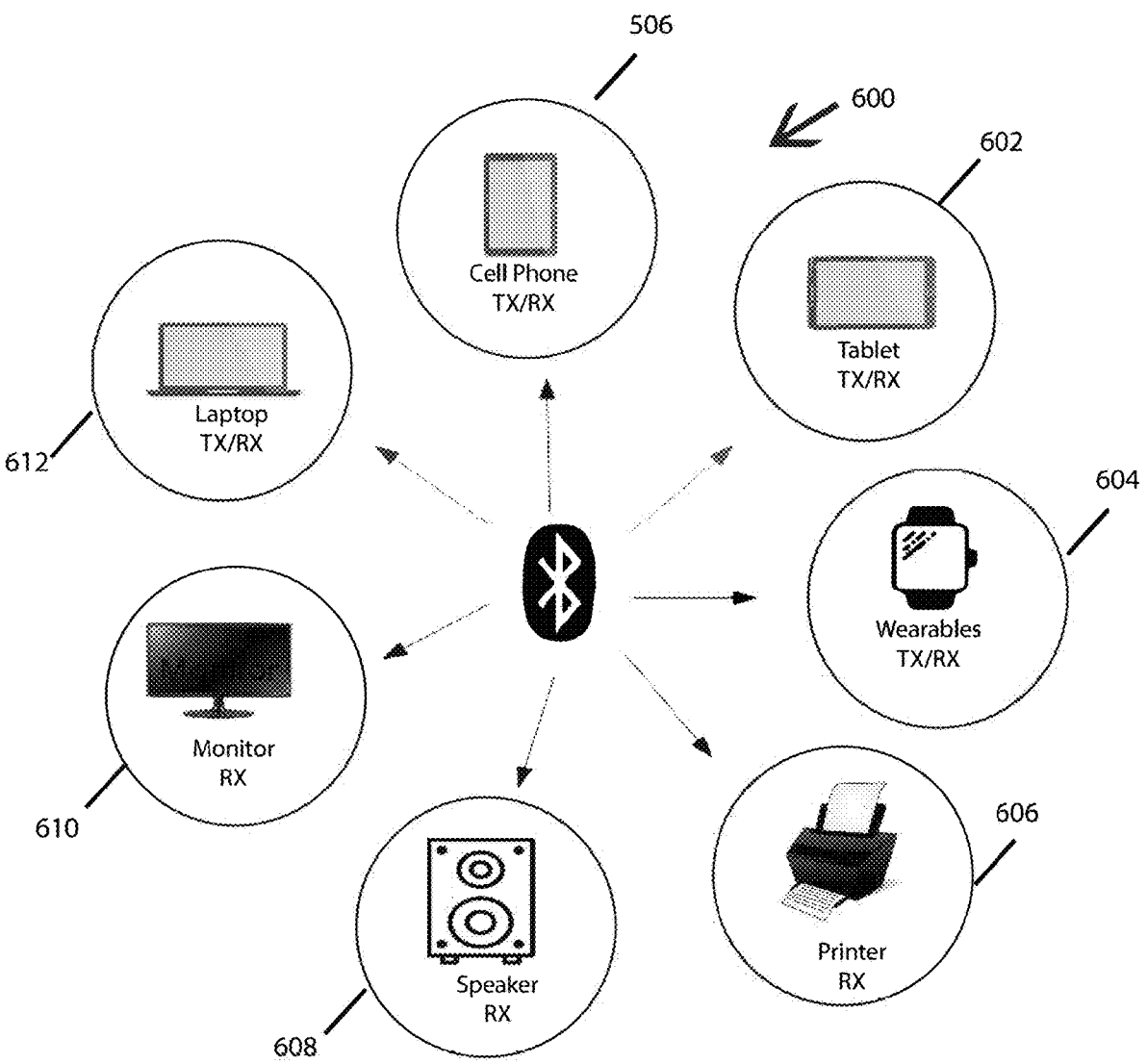
FIG. 5 is a schematic view of a BLUETOOTH® wireless network in which the process of FIG. 1 and/or the devices of FIG. 2 may be utilized.

Referring also to FIG. 5, use cases for the process 100, device 210 and receiver 300 are shown in the context of a short-range wireless network 600 such as a BLUETOOTH® wireless network or WI-FI® wireless network. Each device described in the context of the wireless network 600 of FIG. 5 may be considered to be either a transmitting device 210 or a receiver 300, and any of those devices may utilize the process 100 for transmitting encrypted data as either a transmitting device 210 or a receiver 300. The wireless network 600 may be utilized by a cell phone 506, a tablet 602, a wearable device 604 such as a smart watch, a printer 606, one or more speakers 608, a monitor 610, and/or a laptop 612. Communications between any of the devices that utilize the wireless network 600 may be encrypted using the process 100, implemented on the devices themselves, without the need for the wireless network 600 to perform any tasks related to encryption; the wireless network 600 simply transmits encrypted data between devices.

Figure 6:
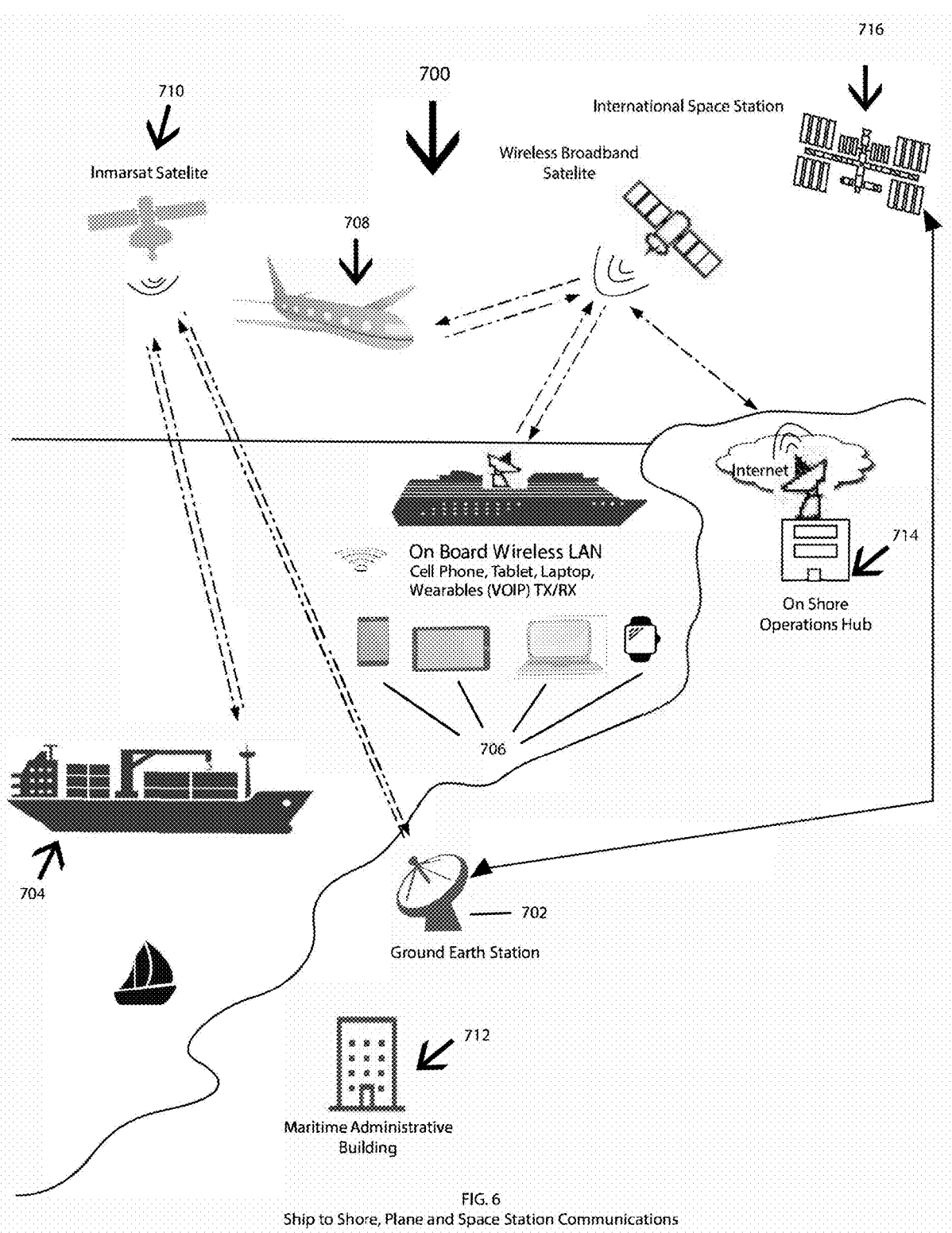
FIG. 6 is a schematic view of communications between ground stations and a ship, airplane or spacecraft in which the process of FIG. 1 and/or the devices of FIG. 2 may be utilized.

Referring also to FIG. 6, use cases for the process 100, device 210 and receiver 300 are shown in the context of a long-range communications network 700 used to connect one or more ground stations 702 to vehicles at sea, in the air and/or in space. Each device described in the context of the long-range communications network 700 of FIG. 6 may be considered to be either a transmitting device 210 or a receiver 300, and any of those devices may utilize the process 100 for transmitting encrypted data as either a transmitting device 210 or a receiver 300. The long-range communications network 700 may be utilized by a ship 704, devices 706 aboard a ship 704, an airplane 708, a satellite 710, a maritime administration building 712, an operations hub 714, and/or a crewed or uncrewed spacecraft or space station 716 such as the International Space Station, whether in Earth orbit, lunar orbit, or elsewhere. Communications between any of the devices that utilize the long-range communications network 700 may be encrypted using the process 100, implemented on the devices themselves, without the need for the long-range communications network 700 to perform any tasks related to encryption; the long-range communications network 700 simply transmits encrypted data between devices.

The use cases described above with regard to FIGS. 4-6 are exemplary and not limiting; the process 100, transmitting device 210 and receiver 300 may be used in other networks, and may encompass other devices. For example, the transmitting device 210 and/or receiver 300 may be devices included in the "internet of things" (IOT); that is, they may be devices that include sensors or other hardware that interface with other devices and systems over the Internet or other wireless communication system.

As used in this document, and as customarily used in the art, the word "substantially" and similar terms of approximation refer to normal variations expected in manufacturing and communications; for example, from normal variations in network and communications properties, and in the measurement of such variations.

While the invention has been described in detail, it will be apparent to one skilled in the art that various changes and modifications can be made and equivalents employed, without departing from the present invention. It is to be understood that the invention is not limited to the details of construction, the arrangements of components, and/or the method set forth in the above description or illustrated in the drawings. Statements in the abstract of this document, and any summary statements in this document, are merely exemplary; they are not, and cannot be interpreted as, limiting the scope of the claims. Further, the figures are merely exemplary and not limiting. Topical headings and subheadings are for the convenience of the reader only. They should not and cannot be construed to have any substantive significance, meaning or interpretation, and should not and cannot be deemed to indicate that all of the information relating to any particular topic is to be found under or limited to any particular heading or subheading. Therefore, the invention is not to be restricted or limited except in accordance with the claims.

What is claimed is:

1. An apparatus for providing secure data communications, comprising:
    a processor;
    memory in electronic communication with said processor;
    an output in electronic communication with said processor; and
    instructions stored in said memory and executable by said processor to cause the apparatus to:
    store a plurality of encryption protocols;
    store at least one encryption hopping protocol;
    perform nested encryption of at least some of the data utilizing said at least one selected encryption hopping protocol;
    transmit the data upon which nested encryption was performed from one device to at least one other device; and wherein said instructions stored in said memory and executable by said processor to cause the apparatus to perform nested encryption comprise instructions executable by said processor to:
    select a number of layers of encryption to apply to data to be transmitted;
    select at least one said encryption hopping protocol;
    encrypt data associated with each said layer of said encryption with one of said encryption protocols according to said selected encryption hopping protocol; and
    repeat said encrypt data instructions for each said layer of said encryption.

2. The apparatus of claim 1, further comprising at least one encryption microprocessor in electronic communication with said processor, wherein each said encryption microprocessor stores at least one said encryption protocol, and performs at least one of encryption and decryption of data received thereby.

3. A method for secure communication of data between two or more devices, comprising:
    storing a plurality of encryption protocols;
    storing at least one encryption hopping protocol;
    performing nested encryption of at least some of the data, comprising
        selecting a number of layers of encryption to apply to data to be transmitted;
        selecting at least one said encryption hopping protocol;
        encrypting data associated with one said layer of said encryption with one of said encryption protocols according to said selected encryption hopping protocol; and repeating said encrypting data for each said layer of said encryption; and then transmitting data from one device to at least one other device utilizing said selected at least one encryption hopping protocol.

4. The method of claim 3, wherein said selecting a number of layers comprises selecting a fixed number.

5. The method of claim 4, wherein said fixed number is three.

6. The method of claim 3, wherein said selecting a number of layers comprises utilizing layer hopping.

7. The method of claim 6, wherein said hopping comprises performing at least one action selected from the group consisting of: linear hopping, date-based hopping, and time-based hopping.

8. The method of claim 3, wherein said at least one encryption hopping protocol comprises at least linear hopping.

9. The method of claim 3, wherein said at least one encryption hopping protocol comprises at least date-based hopping.

10. The method of claim 3, wherein said at least one encryption hopping protocol comprises at least time-based hopping.

11. The method of claim 3, wherein said performing nested encryption further comprises encrypting data associated with each said layer of said encryption using a different encryption protocol.

12. The method of claim 3, wherein said performing nested encryption is performed for all of the data.

13. The method of claim 3, further comprising synchronizing time between the devices.

14. The method of claim 3, wherein said number of layers is at least two, and wherein each said layer of nested encryption is more secure than the previous said layer of nested encryption.

15. The method of claim 3, wherein said selecting at least one said encryption hopping protocol is based on publicly-accessible information.

16. A non-transitory computer-readable medium storing code for performing encryption hopping, the code comprising instructions executable by a processor to:

store a plurality of encryption protocols;

store at least one encryption hopping protocol;

receive data to be encrypted;

perform nested encryption of the data, the instructions to perform said nested encryption comprising code executable by a processor to select a number of layers of encryption to apply to data to be transmitted, select at least one said encryption hopping protocol, encrypt data associated with one said layer of said encryption with one of said encryption protocols according to said selected encryption hopping protocol, and repeat said encrypt data instructions for each said layer of said encryption; and then transmit data from one device to at least one other device utilizing said at least one selected encryption hopping protocol.

17. The non-transitory computer-readable medium storing code for performing encryption hopping of claim 16, wherein the instructions to perform said select a number of layers of encryption comprise instructions to perform layer hopping.

18. The non-transitory computer-readable medium storing code for performing encryption hopping of claim 16, wherein said number of layers is at least two; further comprising instructions to select encryption for said layers wherein each said layer of nested encryption is more secure than the previous said layer of nested encryption.

19. The non-transitory computer-readable medium storing code for performing encryption hopping of claim 16, wherein the instructions to perform nested encryption further comprise instructions to encrypt data associated with each said layer of said encryption using a different encryption protocol.

* * * * *